United States Patent [19]
Davenport

[11] 3,990,505
[45] Nov. 9, 1976

[54] AIR-CONDITIONING SYSTEMS
[75] Inventor: Christopher John Davenport, Leamington Spa, England
[73] Assignee: Associated Engineering Limited, England
[22] Filed: May 16, 1975
[21] Appl. No.: 578,026

[30] Foreign Application Priority Data
May 24, 1974 United Kingdom............... 23439/74

[52] U.S. Cl. ................................... 165/43; 62/243
[51] Int. Cl.² ........................................ B60H 3/04
[58] Field of Search ............................... 165/42, 43

[56] References Cited
UNITED STATES PATENTS

| | | | |
|---|---|---|---|
| 2,801,827 | 8/1957 | Dolza | 165/43 |
| 3,171,474 | 3/1965 | Roane | 165/43 |
| 3,774,676 | 11/1973 | Franz | 165/42 |
| 3,834,451 | 9/1974 | Kozinski | 165/13 |
| 3,841,395 | 10/1974 | Steimmann | 165/42 |

Primary Examiner—Charles J. Myhre
Assistant Examiner—Theophil W. Streule, Jr.
Attorney, Agent, or Firm—Brisebois & Kruger

[57] ABSTRACT

An air-conditioning system particularly, but not exclusively, for vehicles employs a single liquid/air heat exchanger and means selectively to supply either hot liquid or cooled liquid to said heat exchanger whereby selectively to heat or cool the air passing through said heat exchanger. As applied to a motor vehicle, the system only requires a single heat exchanger on the interior side of the vehicle bulkhead.

5 Claims, 3 Drawing Figures

AIR-CONDITIONING SYSTEMS

This invention relates to air-conditioning systems, particularly but not exclusively for vehicles.

Known air-conditioning systems for vehicles employ a hot liquid, e.g. engine coolant, fed to a coolant/air heat exchanger, and a refrigerant circuit fed to a refrigerant/air heat exchanger, the heated air from the first-mentioned heat exchanger and the cooled air from the second-mentioned heat exchanger being employed in order to provide air at the required temperature for the interior of the vehicle.

According to the present invention, there is provided an air-conditioning system having a single liquid/air heat exchanger, and means selectively to supply hot liquid or cooled liquid to said heat exchanger, whereby selectively to heat or cool the air passing through said heat exchanger.

Said means preferably includes a two-way valve, having a single outlet connected to the liquid/air heat exchanger and two inlets, one connected to receive a suitable hot liquid (in a vehicle preferably engine coolant) and the other being connected to receive a liquid cooled to subatmospheric temperature.

Figure 1:
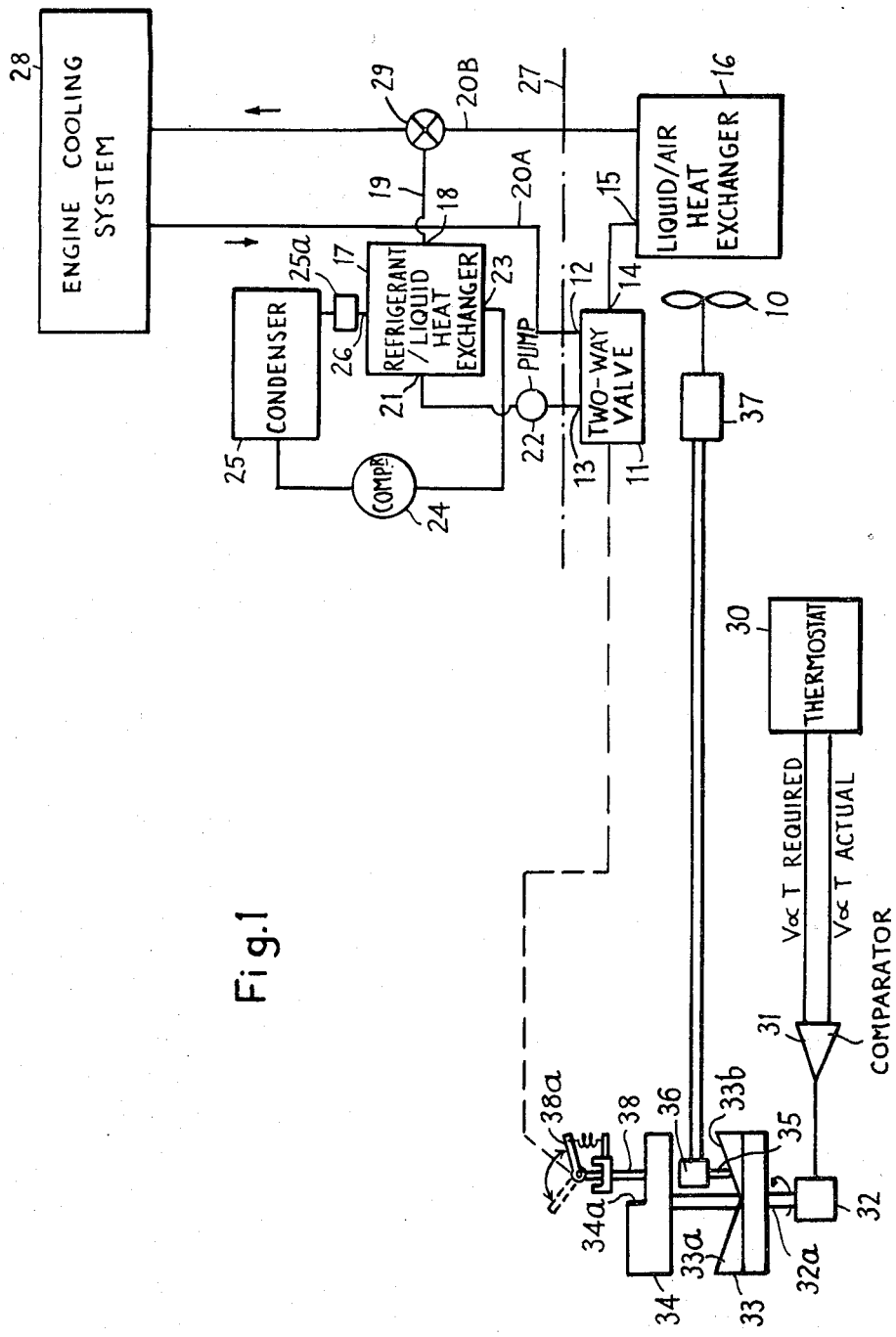
Figure 2:
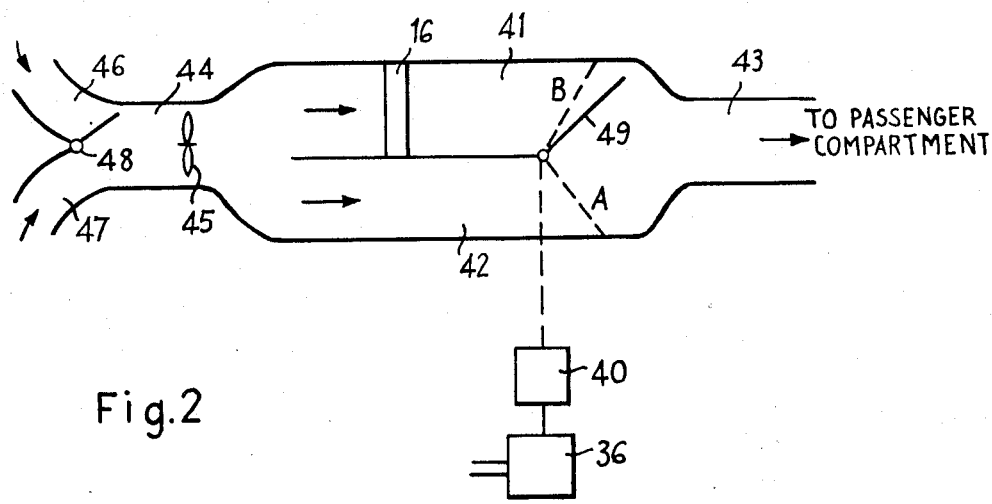
Figure 3:
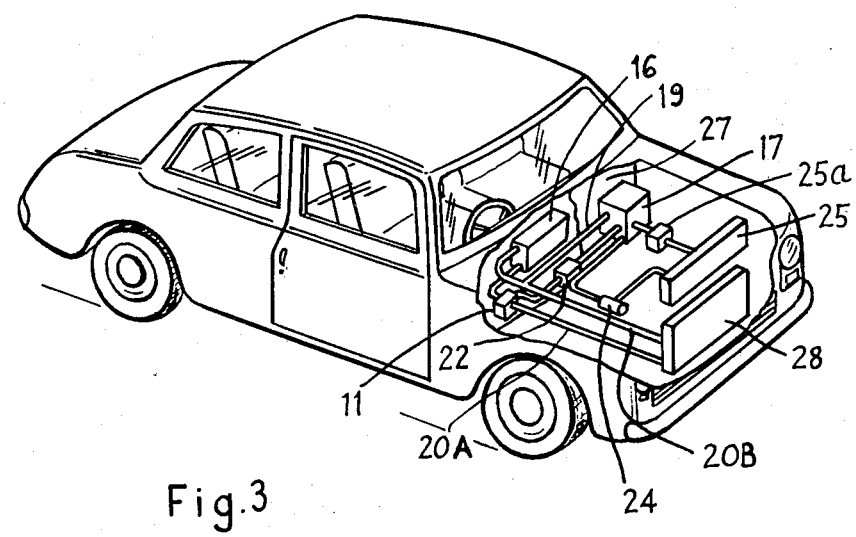

The invention will now be further described by way of example, with reference to the accompanying drawings, in which:

FIG. 1 is a diagram illustrating one embodiment of an air-conditioning system in accordance with the invention, FIG. 2 is a diagram showing a part of a further embodiment, and FIG. 3 shows how the air-conditioning system may be arranged in motor vehicle.

Referring to FIG. 1, the air-conditioning system to be described is intended for use in a motor vehicle, e.g. to supply conditioned air to the passenger compartment of a motor car. In accordance with the invention, heat is selectively exchanged between either a hot liquid or a cooled liquid and the air to be supplied to the interior of the vehicle. Thus, the system includes a two-way changeover valve 11 which has two inlets 12 and 13 and an outlet 14. The inlet 12 is connected through a feed pipe 20A to receive a hot liquid, in this case heated engine coolant from the engine cooling system 28 of the vehicle. The inlet 13 is connected via a pump 22 to receive cooled liquid from a refrigerating circuit which will be described later. The outlet 14 of valve 11 is connected to the liquid inlet 15 of a liquid/air heat exchanger 16. Air is passed through heat exchanger 16 by a variable speed fan 10 and is supplied to the compartment to be air-conditioned, i.e. the interior space of the vehicle. The two-way valve 11 is operated to connect the outlet 14 to inlet 12 when heating is required, and to inlet 13 when cooling is required. Although the valve may be manually operated it is preferably operated by an automatic control system, as will be described.

The refrigerating circuit for providing the cooled liquid includes a refrigerant/liquid heat exchanger 17 which has its liquid inlet 18 connected via a pipe 19 to the liquid outlet pipe 20B from the liquid/air heat exchanger 16. The liquid outlet 21 from the refrigerant/liquid heat exchanger 17 is connected via the pump 22 to the inlet 13 of the two-way valve 11, as mentioned above. The refrigerant, which may be freon, is evaporated in expansion valve 25a and heat exchanger 17, thus taking up heat from the liquid fed through this heat exchanger, and passes in gaseous form from the refrigerant outlet 23 to a compressor 24 which compresses it and passes it to an air-cooled condenser 25. The refrigerant liquefies in this condenser and is fed to an expansion valve 25a, from where it passes to the refrigerant inlet 26 of the heat exchanger 17. Thus liquid derived from outlet pipe 20B and cooled to subatmospheric temperature in heat exchanger 17 is fed to inlet 13 of the two-way valve 11.

The chain dotted line 27 indicates the bulkhead between the vehicle engine compartment and the interior space of the vehicle which is to be air-conditioned. The valve 11 may, if desired, be outside the passenger compartment, i.e. on the other side of the bulkhead 27 from that indicated.

In operation, when inlet 12 of the two-way valve 11 is connected to the outlet 14, the hot engine coolant from the engine cooling system 28 will be supplied to the liquid/air heat exchanger 16, and will pass back to its source through outlet pipe 20B. Air passed through the heat exchanger 16 by the fan 10 will be heated and fed to heat the interior space of the vehicle to be air-conditioned.

On the other hand, when inlet 13 of valve 11 is connected to the outlet 14, liquid drawn from outlet pipe 20B through pipe 19 will be recirculated through heat exchanger 17, pump 22, valve 11 and heat exchanger 16. This liquid is cooled in heat exchanger 17, and thus air passed through heat exchanger 16 by the fan 10 is cooled before being fed into the interior space of the vehicle to be air-conditioned, thereby cooling this space.

If desired, a further valve 29, which is ganged with valve 11, may be provided at the junction of pipe 19 and pipe 20B. This valve 29 connects heat exchanger 16 only to pipe 19 when the valve 11 is in the position where inlet 13 is connected to outlet 14, and serves to isolate the cooled liquid circuit from the engine cooling system 28. The valve 29 connects heat exchanger 16 only to the engine cooling system 28 when valve 11 is positioned to connect inlet 12 to outlet 14. However, with many installations this further valve 29 will not be found necessary, since the cooled liquid is circulating around a closed circuit and pipe 20B will be full of liquid.

The operation of a control system for the two-way valve 11 and the fan 10 will now be described.

The system is controlled by a thermostat 30 which regulates the speed of the air fan 10 in accordance with any difference between a required space temperature setting and a sensed actual space temperature, in conjunction with a cam control system to operate the two-way valve 11 to change from a heating mode to a cooling mode of operations or vice versa. More specifically, the thermostat output, in the form of a voltage proportional to the required temperature setting and a voltage proportional to the actual temperature of the space to be air-conditioned, is applied to a comparator 31 which controls the rotation of an electric motor 32. The output shaft 32a of the motor 32 rotates at a low speed through a reduction gear arrangement and this shaft drives two cams, 33 and 34.

The cam 33 comprises two similar and oppositely inclined cam faces 33a and 33b which are engaged by a cam follower 35 which operates a rheostat 36. This rheostat in turn controls the electric drive motor 37 for the fan 10 and hence the speed of the fan.

The cam 34 has a step 34a and is associated with a pivoted member 38 in the form of a bell crank whose arm 38a pivots between two positions, as the cam follower rides up and down the step 34a. This movement is applied to operate the two-way valve 11, through a suitable connection, e.g. an electrical connection. The step 34a on cam 34 is aligned with the junction between the two inclined faces 33a and 33b of the cam 33.

It will be appreciated that the rate of heating or cooling of the compartment to be air-conditioned is governed by the speed of the fan 10. When the system is operating with valve 11 in the heating mode, i.e. when the temperature sensed by the thermostat 30 is colder than that required, the speed of the fan will gradually decrease as the sensed temperature increases due to the reduction in the difference between the required temperature and the actual temperature. The rotation of cam 33 by the motor 32 fed from comparator 31 and the corresponding operation of the rheostat 36 by cam follower 35 adjusts the speed of the motor 37 driving the fan 10, as the cam follower 35 moves down one of the inclined faces of the cam, e.g. face 33a. When the actual temperature sensed by the thermostat 30 corresponds to the required temperature the cam follower 35 is in the trough between the two inclined faces 33a and 33b of the cam 33 and the cam follower 38 is positioned at the step 34a of the cam 34, so that at this time the arm 38a of member 38 causes actuation of the two-way valve 11 to the cooling mode. The cam follower 35 commences to ride up the other inclined surface of the cam, e.g. face 33b, as the sensed temperature increases thereby operating rheostat 36 to increase the speed of motor 37 and hence of the fan 10 and thereby to increase the volume of cooled air passed into the passenger compartment.

The control system thus operates to control the fan speed and the operation of the two-way valve 11 between the heating mode and the cooling mode as is necessary to maintain the required temperature in the compartment to be air-conditioned.

FIG. 2 is a diagram of an alternative arrangement for feeding the air to the compartment to be air-conditioned and for controlling the air temperature. In this arrangement instead of passing air through heat exchanger 16 by fan 10 controlled by rheostat 36, air is fed to the compartment through a duct system including two parallel passages 41 and 42 which combine into a common outlet passage 43. The liquid/air heat exchanger 16 is located in the passage 41. The inlet to passages 41 and 42 consists of a passage 44 containing a fan 45 which draws air through two inlet ducts 46 and 47. The duct 46 communicates with the compartment to be air-conditioned and the duct 47 communicates with the outside atmosphere. A flap valve 48 pivotally connected at the outlets of ducts 46 and 47 acts as a proportioning valve governing the proportion of outside air to recirculated air drawn from the compartment to be air-conditioned by fan 45. A further pivoted flap valve 49 is connected at the outlet of passages 41 and 42 and is movable by a motor 40 controlled by rheostat 36 of the system previously desribed. The arrangement operates as follows. At the coldest temperature when maximum heating is required and the two-way valve 11 is positioned so that the heat exchanger 16 is operating in the heating mode, the flap valve 49 is in position A, shown in broken lines, to close off passage 42 and enable fan 45 to circulate the maximum amount of heated air to the compartment to be air-conditioned. As the temperature of the compartment increases towards the required temperature, the control system comprising thermostat 30, comparator 31, motor 32, cam 33 and cam follower 35 controls rheostat 36 and hence motor 40 so as progressively to move flap valve 49 from position A to position B, also shown in broken lines, whereat passage 42 is open and passage 41 is closed. This state occurs at the required temperature, when the two-way valve 11 is changed to the cooling mode as previously described. As the heat exchanger 16 operates in the cooling mode, the flap valve 49 moves progressively from position B at the required temperature to position A at the hottest temperature for which the system is designed.

FIG. 3 is a diagrammatic view of a motor car showing how the system described with reference to FIG. 1 may be installed.

It will be evident that, by comparison with the conventional system, in which air is passed through two separate heat exchangers into the vehicle interior or other space to be air-conditioned, with two sets of fluid connections, the present system represents a considerable improvement, requiring only a single heat exchanger on the interior side of the vehicle bulkhead.

I claim:
1. An air-conditioning system comprising:
    a liquid/air heat exchanger;
    a two-way valve having two inlets and an outlet;
    means connecting said valve outlet to said liquid/air heat exchanger;
    means for supplying a heated liquid to one inlet of said valve;
    means for feeding liquid from said liquid/air heat exchanger to a refrigerant/liquid heat exchanger;
    a refrigerating circuit for feeding a refrigerant to said refrigerant/liquid heat exchanger;
    means for feeding cooled liquid from said refrigerant-/liquid heat exchanger to the other inlet of said valve;
    means for selectively operating said two-way valve so as to feed either said heated liquid, or cooled liquid from said refrigerant/liquid heat exchanger, to said liquid/air heat exchanger; and
    means for entraining a flow of air through said liquid-/air heat exchanger.

2. A system as claimed in claim 1, comprising a fan for entraining air through said liquid/air heat exchanger and a control system for controlling the operation of said air-conditioning system including a thermostat producing a first signal proportional to a required temperature setting and a second signal proportional to the actual temperature in the space to be air-conditioned, a comparator fed with said first and second signals and producing an output controlling the rotation of a first cam and a second cam, a first cam follower engaging said first cam and actuating means for controlling the speed of said fan and a second cam follower engaging said second cam and actuating means for operating said two-way valve.

3. A vehicle air-conditioning system for a vehicle having an engine cooled by a liquid coolant, said system comprising:
    a liquid/air heat exchanger;
    a two-way valve having two inlets and an outlet;
    means connecting said valve outlet to said liquid/air heat exchanger;

means for supplying heated liquid engine coolant to one inlet of said valve;

means for feeding said liquid engine coolant from said liquid/air heat exchanger to a refrigerant/liquid heat exchanger;

a refrigerating circuit for feeding a refrigerant to said refrigerant/liquid heat exchanger;

means for feeding cooled liquid engine coolant from said refrigerant/liquid heat exchanger to the other inlet of said valve;

means for selectively operating said two-way valve so as to feed either said heated liquid, or cooled liquid from said refrigerant/liquid heat exchanger, to said liquid/air heat exchanger; and means for entraining a flow of air through said liquid/air heat exchanger to the interior of said vehicle.

4. A system as claimed in claim 3, comprising a fan for entraining air through said liquid/air heat exchanger and a control system for controlling the operation of said air-conditioning system including a thermostat producing a first signal proportional to a required temperature setting and a second signal proportional to the actual temperature in the vehicle interior to be air-conditioned a comparator fed with said first and second signals and producing an output controlling means for rotating a first cam and a second cam, a first cam follower engaging said first cam and controlling the speed of a motor driving said fan, and a second cam follower engaging said second cam and actuating means for operating said two-way valve.

5. A system as claimed in claim 4, wherein said first cam comprises two similar and oppositely inclined cam faces and said second cam comprises a step aligned with the junction between said two oppositely inclined cam faces on said first cam whereby said second cam follower engages said step to cause operation of said two-way valve when said first cam follower is located at the junction between said two oppositely inclined cam faces.

* * * * *